(12) United States Patent
Sarkar et al.

(10) Patent No.: US 7,640,416 B2
(45) Date of Patent: Dec. 29, 2009

(54) METHOD FOR AUTOMATICALLY RELATING COMPONENTS OF A STORAGE AREA NETWORK IN A VOLUME CONTAINER

(75) Inventors: Prasenjit Sarkar, San Jose, CA (US); Jimmy Paul Strickland, San Jose, CA (US); Brent Cameron Beardsley, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 11/193,959

(22) Filed: Jul. 29, 2005

(65) Prior Publication Data
US 2007/0028069 A1 Feb. 1, 2007

(51) Int. Cl.
G06F 12/00 (2006.01)
G06F 13/00 (2006.01)
G06F 13/28 (2006.01)
G06F 9/26 (2006.01)
G06F 9/34 (2006.01)

(52) U.S. Cl. .................. 711/170; 711/161; 711/162; 711/202; 711/203

(58) Field of Classification Search .................. 711/170
See application file for complete search history.

(56) References Cited

U.S. PATENT DOCUMENTS

| 6,742,090 | B2 | 5/2004 | Sanada et al. |
| 6,801,945 | B2 | 10/2004 | Lin et al. |
| 7,272,848 | B1 * | 9/2007 | Meyer et al. ................... 726/1 |
| 2001/0011235 | A1 | 8/2001 | Kim et al. |
| 2001/0034686 | A1 | 10/2001 | Eder |
| 2002/0007445 | A1 * | 1/2002 | Blumenau et al. ........... 711/153 |
| 2002/0174087 | A1 | 11/2002 | Hao et al. |
| 2003/0187719 | A1 | 10/2003 | Brocklebank |
| 2004/0010435 | A1 | 1/2004 | Stewart et al. |
| 2004/0019518 | A1 | 1/2004 | Abraham et al. |
| 2005/0038717 | A1 | 2/2005 | McQueen, III et al. |
| 2005/0049909 | A1 | 3/2005 | Kumar et al. |
| 2006/0101221 | A1 * | 5/2006 | Harada ........................ 711/170 |
| 2006/0277383 | A1 * | 12/2006 | Hayden et al. ............... 711/170 |

OTHER PUBLICATIONS

"Meet Storage Consolidation Challenges with LSI Logic Storage Systems and QLogic," 2002.
"VERITAS SANPoint™ Control, Realizing SAN potential with a powerfulcentralized management tool," 2001.
"SANshare StoragePartitioning Feature," 2002.
Data Core Software, "SANsymphony TM," 2000.
Enginio, "SANtricity Storage Manager," 2004.

(Continued)

*Primary Examiner*—Christian P Chace
*Assistant Examiner*—Ryan Bertram
(74) *Attorney, Agent, or Firm*—Samuel A. Kassatly; Shimokaji & Associates, P.C.

(57) ABSTRACT

A volume container system automatically relates components of a storage area network in membership association of a volume container. The volume container is an abstract entity that maps a relationship between servers and storage devices. The entity captures network access control between servers and storage subsystems such as, for example, security, access, and zoning. Policies of the volume container guide operations in a volume container. The membership associates access and security within the volume container. The volume container reduces administration required for a storage area network, improves consistency in mapping, security, and zoning, and reduces complexity in consistently replicating a logical group of volumes, making failure recovery easier.

15 Claims, 7 Drawing Sheets

OTHER PUBLICATIONS

Softek, "Softek SANView," 2004.
IBM, "Storage Networking Virtualization, What's it all about?" 2000.
Veritas, "Storage Virtualization," 2001.
Veritas, "VERITAS SANPointControl™—Realizing SAN potential with a powerfulcentralized management tool," 2001.

* cited by examiner

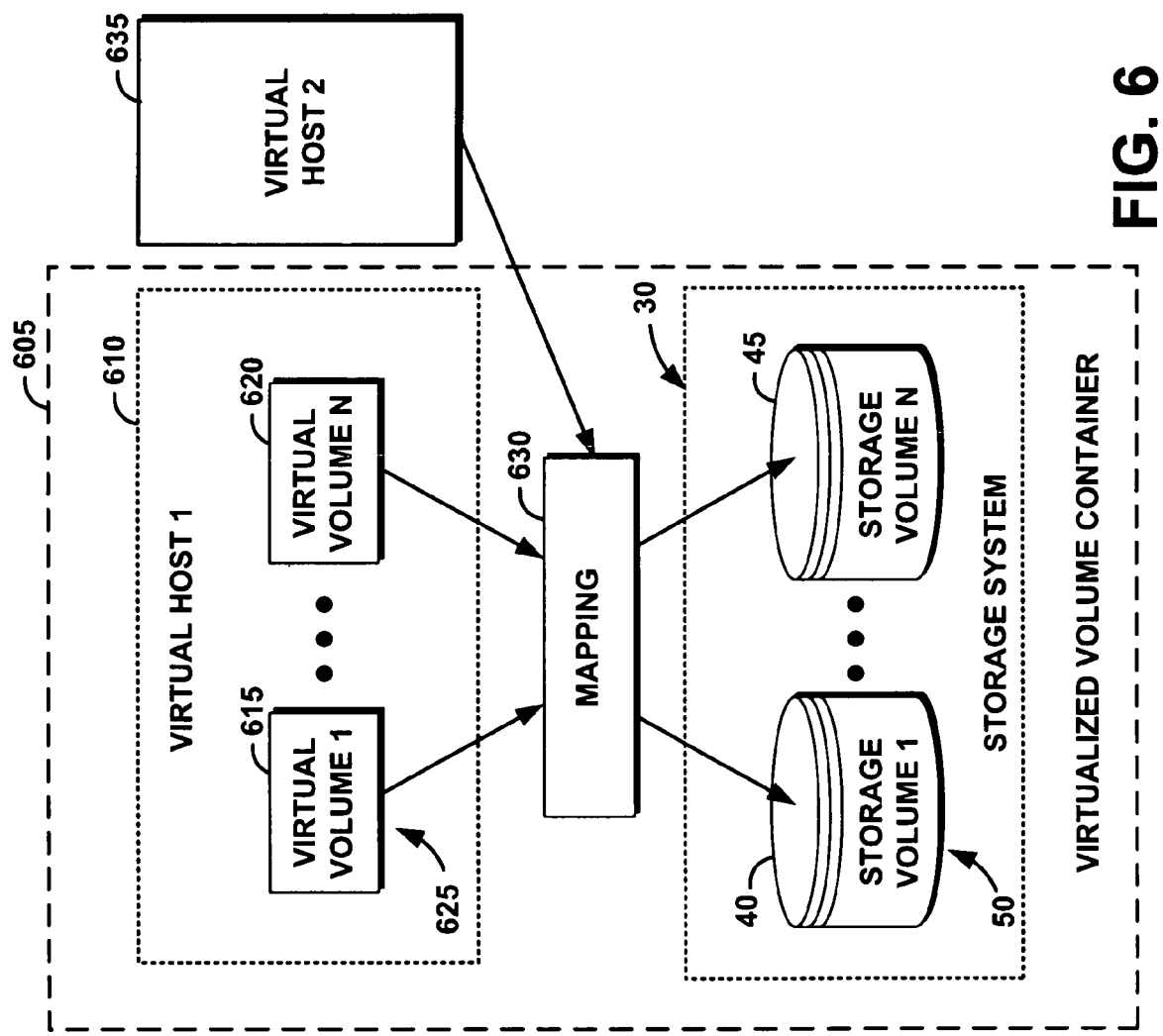

METHOD FOR AUTOMATICALLY RELATING COMPONENTS OF A STORAGE AREA NETWORK IN A VOLUME CONTAINER

FIELD OF THE INVENTION

The present invention generally relates to storage area networks and in particular to a unifying abstraction for components in a storage area network that correlates the entities in a volume container.

BACKGROUND OF THE INVENTION

A storage area network is a network of storage devices or disks. A storage area network can connect one or more servers (host servers) to a centralized pool of disk storage (storage devices or storage volumes). Compared to managing many servers, each with a storage device, use of a storage area network improves system administration.

Although storage area network technology has proven to be useful, it would be desirable to present additional improvements. Conventional methods of managing storage area networks comprise low level primitives (i.e., machine language) that require considerable expertise in storage subsystems, networks, etc. Storage administrators frequently make mistakes in performing these operations.

Furthermore, storage administrators have difficulty in correlating various components such as, for example, host servers and storage devices in a storage area network. A system administrator has to perform mappings between servers and storage devices. Each server and each storage device represents an individual mapping. With many servers and many storage devices, managing issues such as consistent mapping, security, and access are very difficult to configure and maintain.

Conventional storage area networks lack a unifying abstraction for the entities in the storage area network. What is therefore needed is a system, a computer program product, and an associated method for automatically relating components of a storage area network in a volume container. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for automatically relating components of a storage area network in a volume container. The present invention reduces administration required for a storage area network, improves consistency in mapping, security, and zoning, and reduces complexity in consistently replicating a logical group of storage volumes, making failure recovery easier. Consequently, the present system improves scalability of storage area networks.

The volume container is an abstract entity that shows a relationship between servers (interchangeably referenced herein as host servers) and storage devices (interchangeably referenced herein as storage volumes). The volume container automatically captures the assignment of storage volumes in storage subsystems to servers. The volume container further automatically captures network access control between host servers and storage subsystems such as, for example, security, zoning, etc.

Volume containers define a membership collection. Policies of the volume container guide operations (or rules) in a volume container; i.e., how storage volumes are allocated and how host servers are zoned to storage volumes. Consequently, the membership automatically associates access and security within the volume container.

Membership in a volume container by the host server or the storage volume comprises the following implications with respect to adding and removing storage volumes and host servers in the volume container.

Adding a storage volume to a volume container assigns the storage volume to all of the host servers in the storage container. Adding a storage volume to a volume container further zones the storage volume to all of the host servers in the volume container.

Adding a server to a volume container assigns the host server to all of the storage volumes in the volume container. Adding a host server to a volume container further zones all of the host servers to the storage volumes in the volume container.

Removal of a storage volume from a volume container removes assignments of the removed storage volume to host servers in the volume container. Removal of a storage volume from a volume container further removes zones associated with the removed storage volume.

Removal of a host server from a storage container removes assignments of the removed host server to storage volumes in the volume container. Removal of a host server from a volume container further removes zones associated with the removed host server.

A host server may belong to multiple volume containers but a storage volume can belong to at most one volume container.

The present system enables adding a client to a group of clients in a shared file system mounted from a storage volume. Using the volume container to define the shared file system enables automatic access by the added client.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 6 is a diagram illustrating virtualization of a storage area network using the volume container system of FIG. 1.

DETAILED DESCRIPTION OF PREFERRED EMBODIMENTS

The following definitions and explanations provide background information pertaining to the technical field of the present invention, and are intended to facilitate the understanding of the present invention without limiting its scope:

Volume Container: An abstract entity that shows a relationship between servers and storage devices. The entity captures the assignment of volumes from storage subsystems to servers. The entity further captures network access control between servers and storage subsystems such as, for example, zoning.

Figure 1:
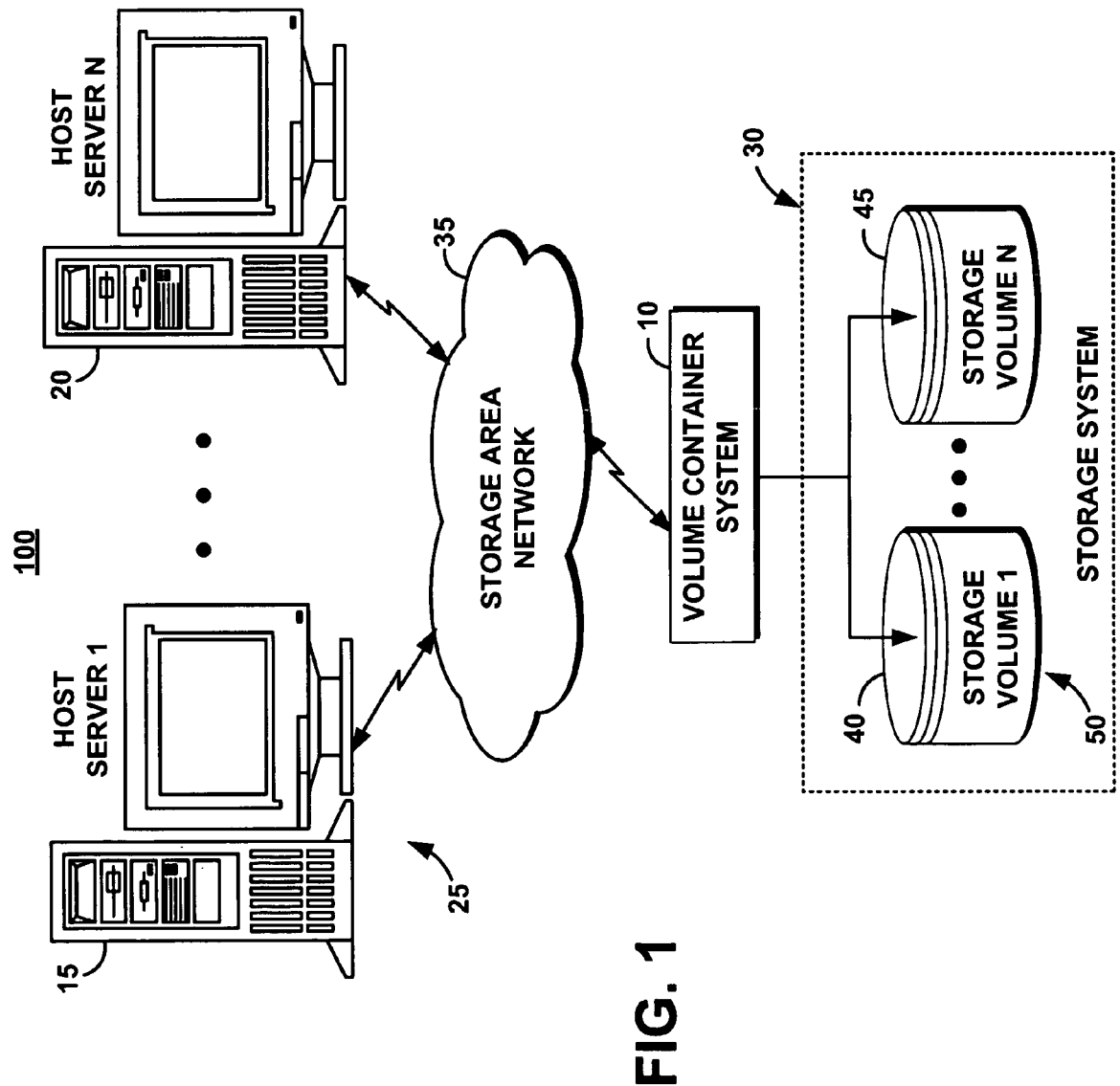
FIG. 1 is a schematic illustration of an exemplary operating environment in which a volume container system of the present invention can be used.

FIG. 1 portrays an exemplary overall environment (a distributed storage system 100) in which a system, a computer program product, and an associated method for automatically relating components of a storage area network in a volume container (the volume container system 10 or the "system 10") according to the present invention may be used. System 10 comprises a software programming code or a computer program product that is typically embedded within a computer that is monitoring the storage area network. Alternatively, system 10 can be saved on a suitable storage medium such as a diskette, a CD, a hard drive, or like devices.

Hosts, such as a host server 1, 15, through a host server N, 20, (collectively referenced as host servers 25) access a storage system 30 through a network 35. The storage system 30 comprises storage devices such as a storage volume 1, 40, through a storage volume N, 45, (collectively referenced as storage volumes 50). While system 10 is described in terms of network 35, host servers 25 may also access the storage system 30 and system 10 locally rather than remotely.

Figure 2:
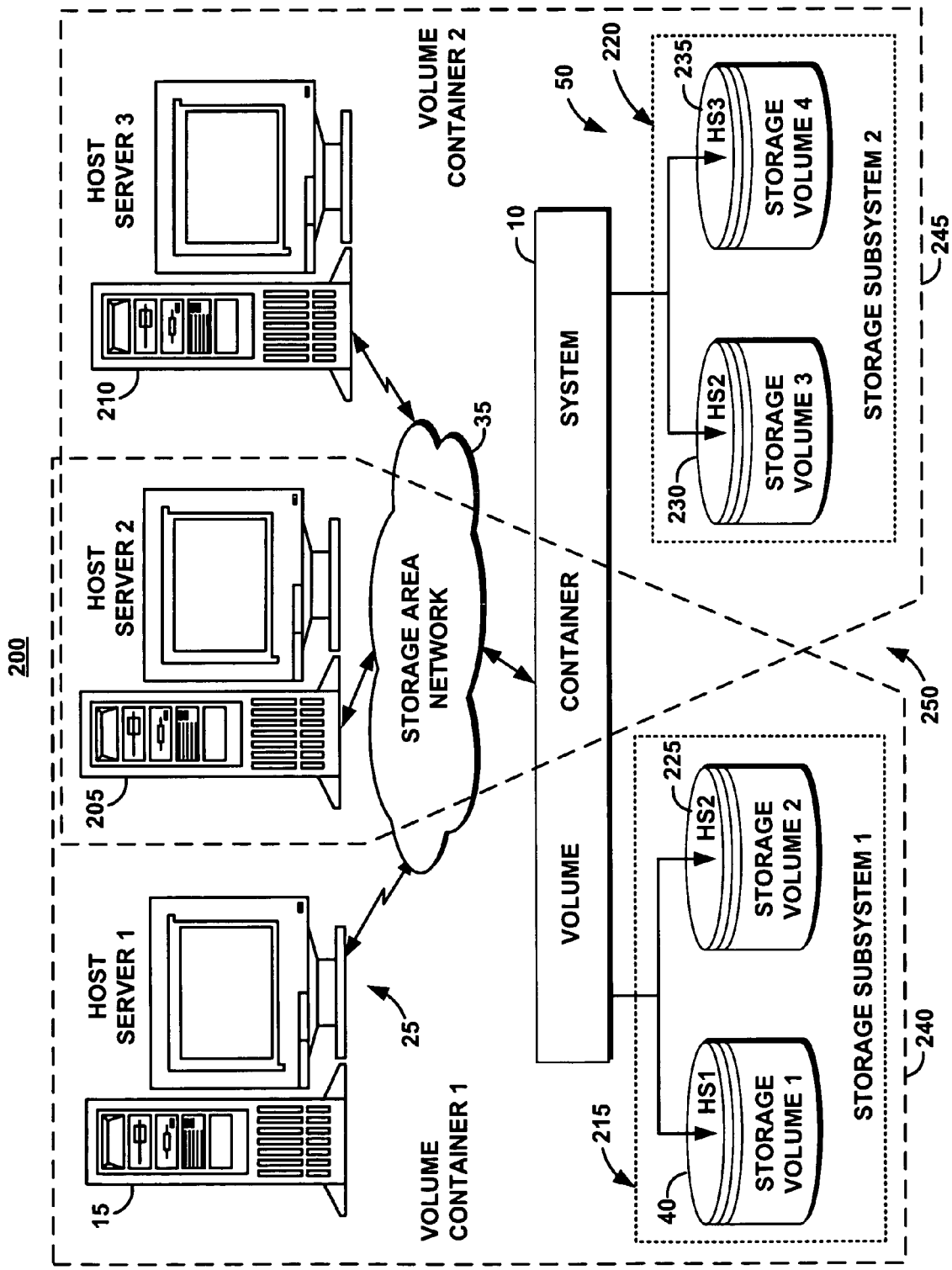
FIG. 2 is a schematic illustration of an exemplary storage area network in which host servers and storage volumes are organized into volume containers by the volume container system of FIG. 1.

System 10 automatically manages assignment of the host servers 25 and the storage volumes 50 into a volume container. FIG. 2 illustrates an exemplary set of volume containers for an exemplary storage system 200. The storage system 200 comprises the host server 1, 15, a host server 2, 205, and a host server 3, 210 (collectively referenced as host servers 25). The storage system 200 further comprises a storage subsystem 1, 215, and a storage subsystem 2, 220. The storage subsystem 1, 215, comprises the storage volume 1, 40, and a storage volume 2, 225. The storage subsystem 2, 220, comprises a storage volume 3, 230, and a storage volume 4, 235. The storage volume 2, 40, the storage volume 2, 225, the storage volume 3, 230, and the storage volume 4, 235, are collectively referenced as storage servers 50.

System 10 automatically maps the host servers 25 and the storage servers 50 in one or more volume containers. In the example of FIG. 2, the host server 1, 15, (HS1) accesses the storage volume 1, 40. The host server 2, 205, (HS2) accesses the storage volume 2, 225 and the storage volume 3, 230. The host server 3, 210, (HS3) accesses the storage volume 4, 235. System 10 groups the host servers 25 and the storage volumes 50 into volume container 1, 240, and volume container 2, 245, collectively referenced as volume containers 250.

In FIG. 2, the volume container 1, 240, comprises the host server 1, 15, the host server 2, 205, the storage volume 1, 40, and the storage volume 2, 225. The volume container 2, 245, comprises the host server 2, 205, the host server 3, 210, the storage volume 3, 230, and the storage volume 4, 235.

The volume containers 250 are abstract entities that illustrate a relationship between the host servers 25 and the storage volumes 50. This abstract entity captures the assignment of storage volumes 50 from the storage subsystem 1, 215, and the storage subsystem 2, 220 to the host servers 25. The volume containers 250 further capture network access control between the host servers 25 and the storage volumes 50. Network access control comprises, for example, zoning, access, and security.

Figure 3:
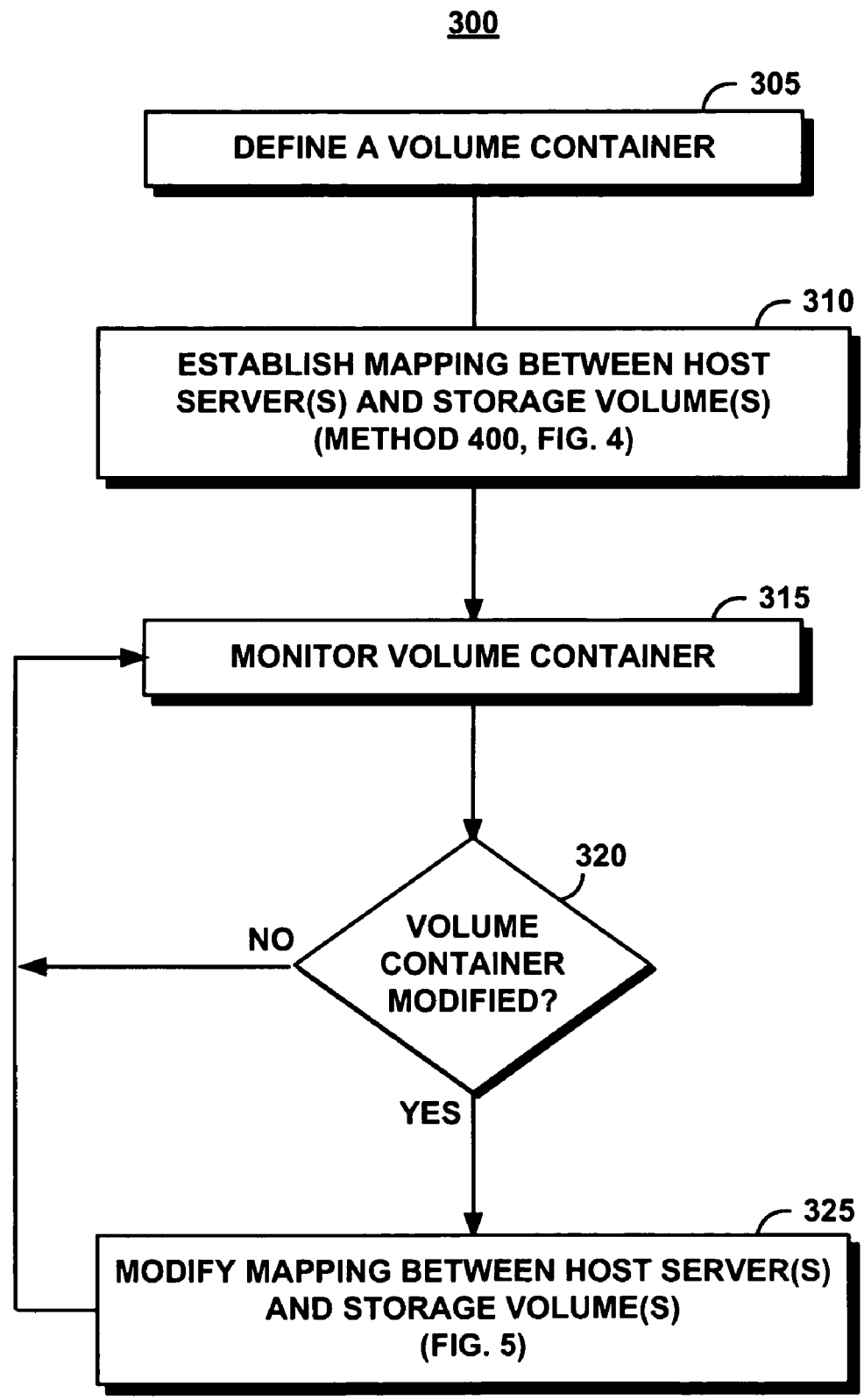
FIG. 3 is a process flow chart illustrating a method of operation of the volume container system of FIG. 1 in generating and managing a volume container.

FIG. 3 illustrates a method 300 of system 10 in generating and managing a volume container. System 10 defines a volume container (step 305). System 10 automatically establishes a mapping between one or more the host servers 25 and one or more the storage volumes 50 in the volume container (step 310, illustrated in more detail in method 400 of FIG. 4). In general, each of the storage volumes 50 is assigned to one volume container. Each of the host servers 25 can be mapped to one or more volume containers.

System 10 monitors the volume container for changes in configuration (step 315). If a modification in the volume container is identified (decision step 320), system 10 modifies a mapping between one or more the host servers 25 and one or more the storage volumes 50 (step 325, illustrated in more detail in method 500 of FIG. 5). In the absence of modification (decision step 320) or after modifying the mapping (step 325), system 10 continues monitoring the volume container (step 315).

Figure 4:
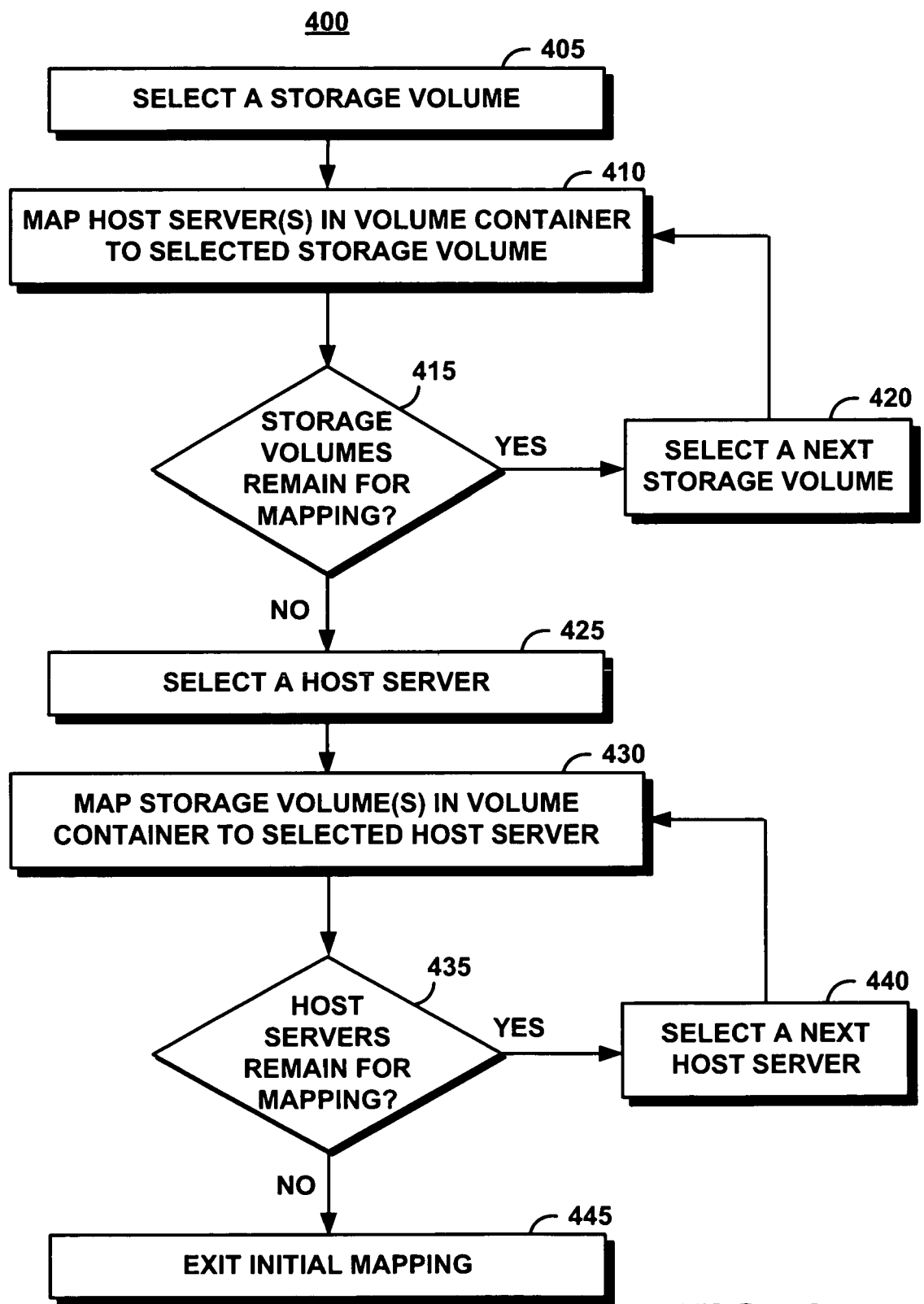
FIG. 4 is a process flow chart illustrating a method of operation of the volume container system of FIG. 1 in establishing a mapping between host servers and storage volumes in a volume container.

System 10 automatically establishes a mapping between the host servers 25 and the storage volumes 50 as illustrated by method 400 of FIG. 4. In the following discussion, the storage volume 1, 40, generally represents individual storage volumes 50; the host server 1, 15, generally represents individual host servers 25. System 10 selects a storage volume such as storage volume 1, 40 (step 405). System 10 maps the host servers 25 in the volume container to the storage volume 1, 40. System 10 determines whether additional storage volumes 50 remain for mapping (decision step 415). If yes, system 10 selects a next storage volume from the storage volumes 50 and repeats step 410 and step 415.

When no storage volumes 50 remain for mapping (decision step 415), system 10 selects one of the host servers 25 (i.e., the host server 1, 15) (step 425). System 10 maps the storage volumes 50 to the selected host server, the host server 1, 15 (step 430). System 10 determines whether additional host servers 25 remain for mapping (decision step 435). If yes, system 10 selects a next host server from the host servers 25 and repeats step 430 and step 435. When no host servers 25 remain for mapping (decision step 435), system 10 exits initial mapping (step 445).

Method 400 illustrates an exemplary order for automatically mapping the host servers 25 and the storage volumes 50. Mapping of the storage volumes 50 (step 405 through step 420) may be performed after mapping of the host servers 25 (step 425 through step 440). Furthermore, mapping of individual volume containers 50 may be interspersed with mapping of individual host servers 25.

Figure 5A:
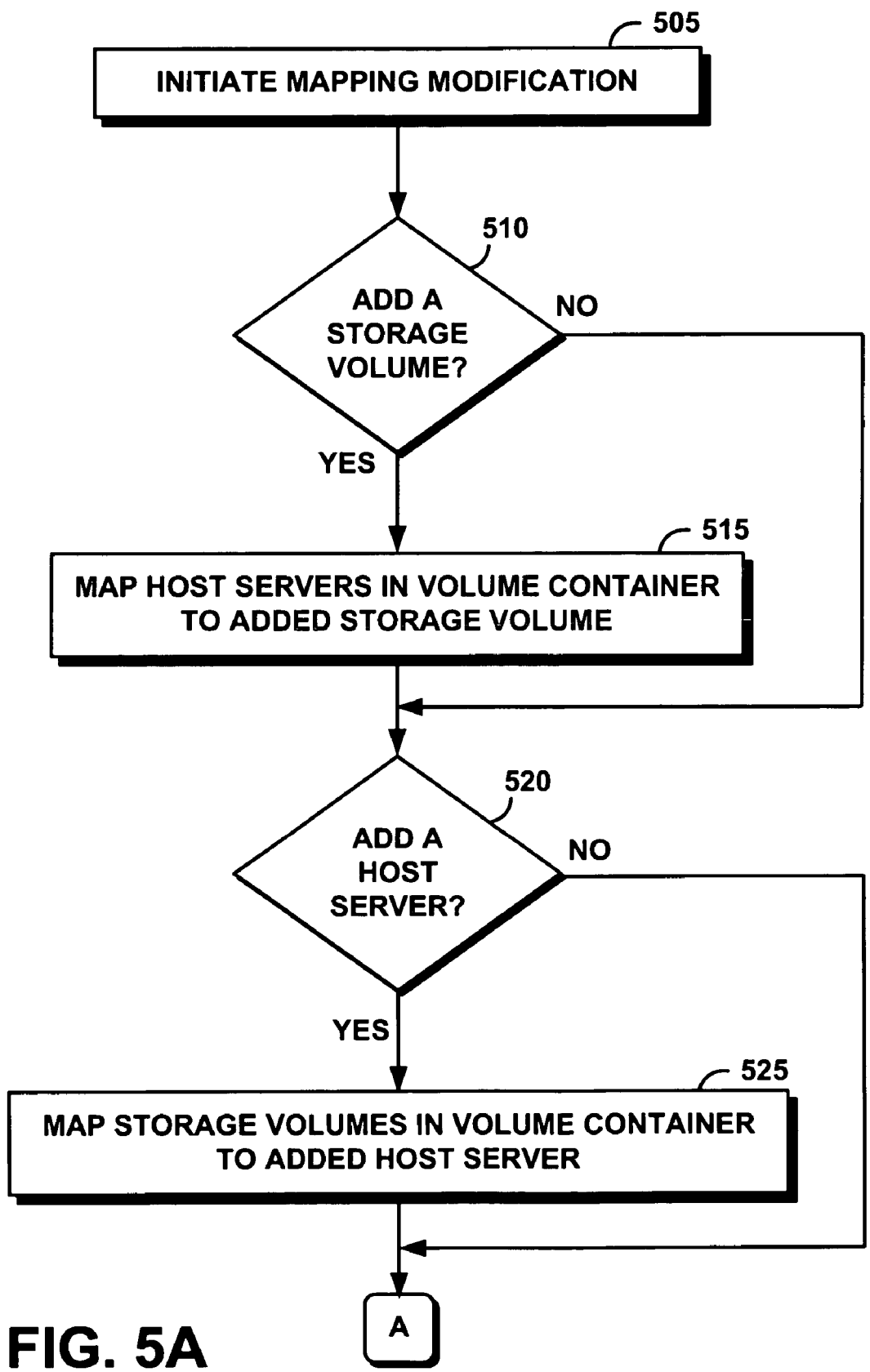
FIG. 5 is a process flow chart illustrating a method of operation of the volume container system of FIG. 1 in modifying a mapping of the volume container.
Figure 5B:
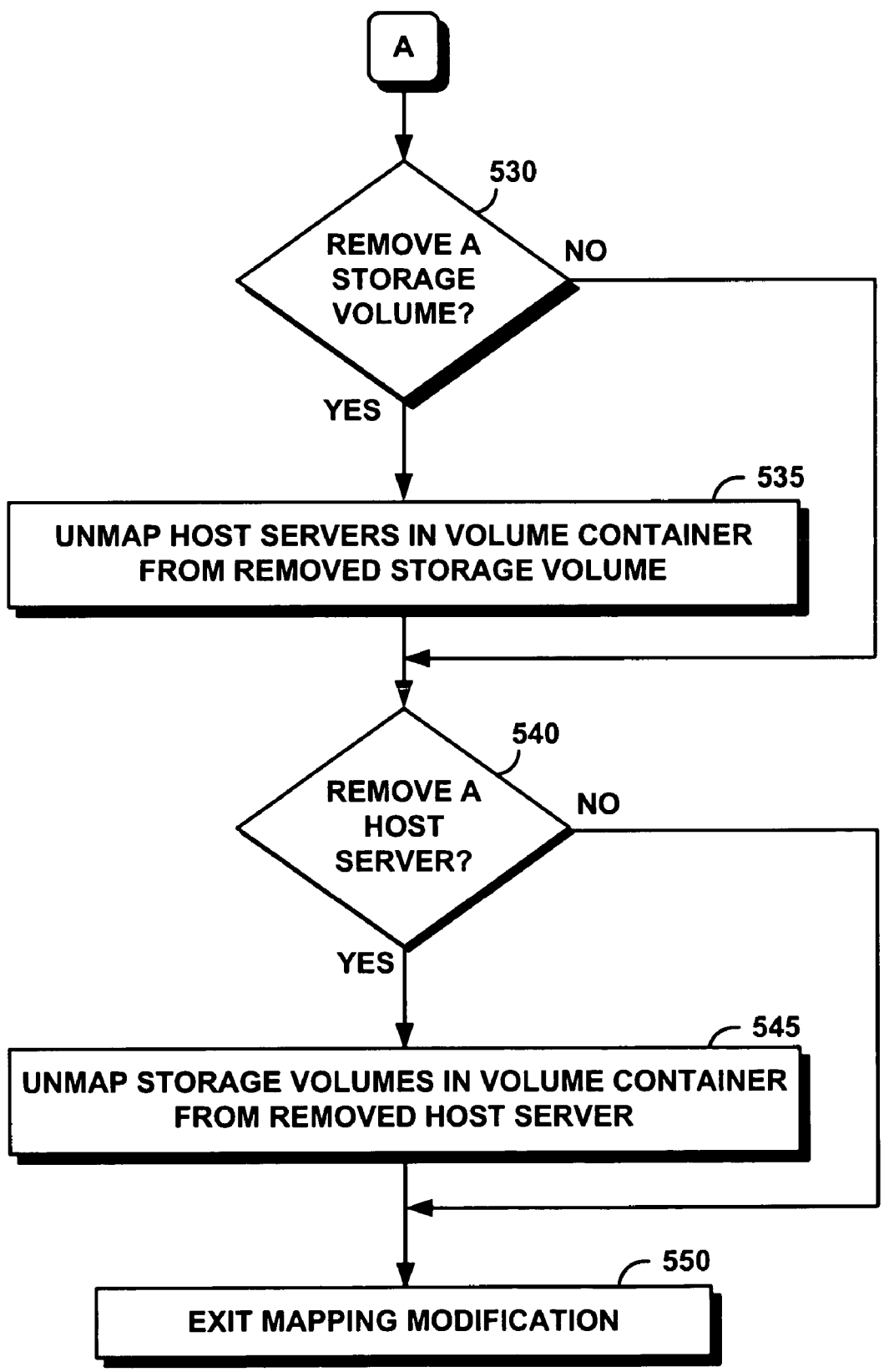

FIG. 5 illustrates a method 500 of system 10 in automatically modifying a mapping of the volume containers. In the following discussion, the storage volume 1, 40, generally represents individual storage volumes 50; the host server 1, 15, generally represents individual host servers 25. System 10 initiates a mapping modification (step 505). If a storage volume such as the storage volume 1, 40, is added to the volume container (decision step 510), system 10 maps the host servers 25 in the volume container to the added storage volume, storage volume 1, 40 (step 515). If a host server such as the host server 1, 15, is being added to the volume container (decision step 520), system 10 maps the storage volumes 50 in the volume container to the added host server, server 1, 15 (step 525).

If a storage volume such as storage volume 1, 40, is being removed from the volume container (decision step 530), system 10 unmaps the host servers 25 in the volume container from the removed storage volume, storage volume 1, 40 (step 535). If a host server such as the host server 1, 15, is being removed to the volume container (decision step 540), system 10 unmaps the storage volumes 50 in the volume container from the removed host server, server 1, 15 (step 545). System 10 exits mapping modification (step 550).

Method 500 illustrates an exemplary order for modifying the mapping the host servers 25 and the storage volume 50 in the volume container. The host servers 25 and the storage volumes 50 may be added or removed in any order.

System 10 can be used to replicate a storage area network. For example, a database system comprises a host server and a set of storage volumes. A database log, database indices, and data are distributed among a set of storage volumes. To replicate the database, the database log, database indices, and data need to be replicated as a set. By placing the host server and the set of storage volumes accessed by the database in a volume container, system 10 can easily replicate the database system by replicating the volume container. In replicating the volume container using system 10, security and access are also replicated, reducing administrative effort and errors and aiding in disk recovery.

FIG. 6 illustrates a virtualized volume container 605 comprising a virtual host such as a virtual host 1, 610, and a storage system such as the storage system 30. The virtual host 1, 610, comprises a virtual volume 1, 615, through a virtual volume N, 620, collectively referenced as virtual volumes 625. The storage system 30 comprises the storage volume 1, 40, through the storage volume N, 45, collectively referenced as the storage volumes 50. The virtual volumes 625 are mapped to the storage volumes 50 by system 10 using a mapping (or mapper) 630.

System 10 provides parallel access for virtual hosts to storage systems such as the storage system 30. System 10 enables parallel access by adding additional hosts such as virtual host 2, 635, to mapping 630. Essentially, system 10 adds virtual host 2, 635, to the virtualized volume container 605. System 10 maps virtual volumes in the virtual host 2, 635, to the storage volumes 50 and maps the storage volumes 50 to the virtual volumes in the virtual host 2, 635. Consequently, system 10 automatically enables consistent access, security, zones, etc. for the virtual host 2, 635, when the virtual host 2, 635, is added to the virtualized volume container 605.

It is to be understood that the specific embodiments of the invention that have been described are merely illustrative of certain applications of the principle of the present invention. Numerous modifications may be made to a system and method for automatically relating components of a storage area network in a volume container described herein without departing from the spirit and scope of the present invention.

What is claimed is:

1. A computer-implemented method of automatically relating components of a storage area network represented as at least one volume container, comprising:

representing storage volumes distributed among a plurality of data files as a data set;

assigning each of a plurality of storage volumes in said network to at least one of said volume containers, said volume containers representing a membership collection of said storage volumes contained therein;

assigning mapping, security, and zoning features, automatically, to each of said storage volumes contained in a single volume container, said features being associated with said volume container;

mapping each of the plurality of storage volumes in each of the at least one volume container to all associated host servers;

mapping the at least one of the plurality of host servers to an associated one of the storage volumes, wherein each host server may be mapped to each of said at least one volume container containing a storage volume to which said host server is associated;

assigning access, security and zones of said volume container to said host server mapped to said volume container;

automatically mapping an introduced host server to the storage volumes in the volume container;

assigning access, security and zones of said volume container to said introduced host server mapped to said volume container; and automatically mapping an introduced storage volume to the host volumes in the volume container in order to automatically relate the storage volumes and the host servers in the volume container;

interspersing mapping of the volume containers with mapping of the host servers;

assigning mapping, security, and zoning features to said introduced storage volume associated with said mapped single volume container, said features being associated with said volume container;

replicating the storage area network by placing the introduced host server, and storage volumes accessed by the database in a volume container and replicating the volume container, and its database, database log, and database indices as a set;

monitoring at the volume container for a change in configuration of the volume container;

modifying a previous mapping between the host servers and the storage volumes after a change in configuration of the volume container; and displaying the mapping between the host servers and the storage volumes on a display device.

2. The method of claim 1, further comprising removing at least one of the host servers.

3. The method of claim 2, wherein removing at least one of the host servers comprises unmapping at least some of the storage volumes that are associated with the removed host server, from the removed host server.

4. The method of claim 1, further comprising removing at least one of the storage volumes.

5. The method of claim 4, wherein removing the storage volume comprises unmapping at least some of the host servers that are associated with the removed storage volume, from the removed storage volume.

6. The method of claim 1, wherein the membership collection defines rules for said storage network applications.

7. The method of claim 1, wherein the membership collection includes rules that automatically associate access within the volume container.

8. A computer-implemented computer program product having a plurality of executable instruction codes stored on a computer-readable medium for automatically relating components of a storage area network in a volume container, comprising:

instruction codes for mapping at least one of a plurality of storage volumes in the volume container to at least one of a plurality of host servers in the volume container;

instruction codes for mapping the at least one of the plurality of host servers to the storage volumes in the volume container;

instruction codes for automatically mapping an introduced host server to the storage volumes in the volume container;

instruction codes for interspersing mapping of the volume containers with mapping of the host servers;

instruction codes for replicating the storage area network by placing the introduced host server, and storage volumes accessed by the database in the volume container and replicating the volume container with its database, database log, and database indices as a set;

instruction codes for automatically mapping an introduced storage volume to the host volumes in the volume container in order to automatically relate the storage volumes and the host servers in the volume container;

instruction codes for monitoring at the volume container for a change in configuration of the volume container; and instruction codes for displaying the mapping between the storage volumes and the host volumes on a display device.

9. The computer program product of claim 8, further comprising instruction codes for removing at least one of the host servers.

10. The computer program product of claim 9, further comprising instruction codes for removing one of the host servers by unmapping at least some of the storage volumes that are associated with the removed host server, from the removed host server.

11. The computer program product of claim 8, further comprising instruction codes for removing at least one of the storage volumes.

12. A computer-implemented computer system for automatically relating components of a storage area network in a volume container on a storage device, comprising:

a computer for mapping at least one of a plurality of storage volumes in the volume container to at least one of a plurality of host servers in the volume container;

the host servers for mapping the at least one of the plurality of host servers to the storage volumes in the volume container;

the host servers further automatically mapping the host servers to the storage volumes in the volume container;

the computer further for interspersing mapping of the volume containers with mapping of the host servers;

the computer further for replicating the storage area network by placing at least one of the host servers, and storage volumes accessed by the database in the volume container and replicating the volume container with its database, database log, and database indices as a set;

the storage device further for automatically mapping an introduced storage volume to the host volumes in the volume container in order to automatically relate the storage volumes and the host servers in the volume container; and a computer display device for displaying the mapping of the host servers to the storage volumes.

13. The computer system of claim 12, wherein each of the storage volumes is assigned to a single instance of the volume container.

14. The computer system of claim 13, wherein the volume container defines a membership collection that includes rules which automatically associate access and security within the single instance of the volume container, and the membership collection rules model storage network by applications.

15. The computer system of claim 12, wherein at least one of the host servers belongs to multiple volume containers.

* * * * *

UNITED STATES PATENT AND TRADEMARK OFFICE
CERTIFICATE OF CORRECTION

PATENT NO. : 7,640,416 B2  
APPLICATION NO. : 11/193959  
DATED : December 29, 2009  
INVENTOR(S) : Sarkar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 609 days.

Signed and Sealed this

Ninth Day of November, 2010

David J. Kappos
*Director of the United States Patent and Trademark Office*